United States Patent [19]
Stavran

[11] Patent Number: 6,012,149
[45] Date of Patent: Jan. 4, 2000

[54] COMPUTER SYSTEM WITH POLYMORPHIC FAULT PROCESSING

[75] Inventor: Scott C. Stavran, Peoria, Ariz.

[73] Assignee: Bull HN Information Systems Inc., Billerica, Mass.

[21] Appl. No.: 08/940,573

[22] Filed: Sep. 30, 1997

[51] Int. Cl.[7] ................................................ G06F 11/34
[52] U.S. Cl. .................. 714/2; 714/3; 714/7; 714/24; 714/25; 395/708; 395/701; 709/245; 709/303
[58] Field of Search .................................... 395/701, 709; 709/303, 245; 714/7, 24, 26, 31, 34, 40, 3, 2, 25

[56] References Cited

U.S. PATENT DOCUMENTS

| | | | |
|---|---|---|---|
| 4,649,515 | 3/1987 | Thompson et al. | 364/900 |
| 5,490,249 | 2/1996 | Miller | 714/26 |
| 5,519,867 | 5/1996 | Moeller et al. | 714/2 |
| 5,649,139 | 7/1997 | Weinreb et al. | 395/412 |
| 5,655,071 | 8/1997 | Habbe et al. | 714/31 |
| 5,664,093 | 9/1997 | Barnett et al. | 417/31 |
| 5,696,486 | 12/1997 | Poliquin et al. | 714/25 |
| 5,768,501 | 5/1996 | Lewis | 714/4 |
| 5,777,549 | 3/1995 | Arrowsmith et al. | 714/25 |
| 5,790,778 | 8/1996 | Bush et al. | 714/34 |

*Primary Examiner*—Robert W. Beausoliel, Jr.
*Assistant Examiner*—Wasseem Hamdan
*Attorney, Agent, or Firm*—B. E. Hayden; J. H. Phillips; John Solakian

[57] ABSTRACT

A computer system includes a main processor and a supervisory processor. The main processor provides status signals when a fault condition exists and responds to control signals for fault recovery. The supervisory processor instantiates objects from a fault class in response to the status signals. Objects are polymorphic in that each object has substantially the same methods available at its interface though each object corresponds to a different fault. Methods accomplish fault recovery by providing the control signals. System operation exhibits fewer errors by the supervisory processor and system expansion is more easily accommodated with greater reuse of proven program code than possible with prior supervisory processor software.

17 Claims, 4 Drawing Sheets

COMPUTER SYSTEM WITH POLYMORPHIC FAULT PROCESSING

FIELD OF THE INVENTION

This invention relates to systems having fault monitors and to automated methods for responding to faults.

BACKGROUND OF THE INVENTION

In many systems, unexpected system operation can be detected by circuits generally known as fault monitor circuits. Fault monitoring is accomplished in a conventional computer system, for example, by a combination of such circuits and fault processing software. Fault processing software records the fact of fault detection by the circuits in order that the event giving rise to the fault can be subsequently analyzed and the circumstances causing it can be treated. By treating the event, continued operation of the system is assured with minimum disruption, notice of intermittent operations can guide maintenance activity, and the overall cost of ownership of the system can be reduced while obtaining, to the greatest extent possible, uninterrupted system operation.

Due to the difficulty of analyzing system operations, the required reliability of fault processing software is extremely high. High reliability software is conventionally obtained through exhaustive software testing. However, in large systems, the difficulty of anticipating sophisticated fault events increases the number of test suites, the cost of developing test suites, and the cost of performing software testing using the test suites.

In view of the problems described above and related problems that consequently become apparent to those skilled in the applicable arts, the need remains in systems having fault monitors for economical and reliable automated methods for responding to faults.

SUMMARY OF THE INVENTION

Accordingly, a system in one embodiment of the present invention includes a central processor and a service processor. The central processor includes a plurality of sets of equivalent processing units, a set of the plurality being capable of providing a fault signal for a failing unit. The service processor responds to the fault signal by performing a method which includes (a) instantiating a polymorphic fault object; (b) identifying the failing unit; and (c) executing a method of the polymorphic fault object to limit use of the failing unit.

According to a first aspect of such a system, fault processing software includes fault objects in hierarchical relationship. The hierarchical relationship permits evolution of the software according to techniques that minimize the scope of software revision. Tests of portions of the software outside the scope of revision need not be repeated, thus avoiding the costs and delays conventionally associated with software testing.

A prerecorded data storage medium in one embodiment of the present invention includes a data storage medium and indicia recorded on the medium. The indicia include instructions, in a program for a first computer, for: (a) recognizing a fault signal provided by a fault monitor of a second computer; (b) instantiating a fault object in response to the fault signal, the fault object comprising a data structure that identifies a fault processing method; and (c) dynamically binding the fault processing method to the program, in response to the data structure.

BRIEF DESCRIPTION OF THE DRAWINGS

A preferred exemplary embodiment of the present invention is described below with reference to the drawing in which.

DETAILED DESCRIPTION OF THE PREFERRED EMBODIMENT

Figure 1:
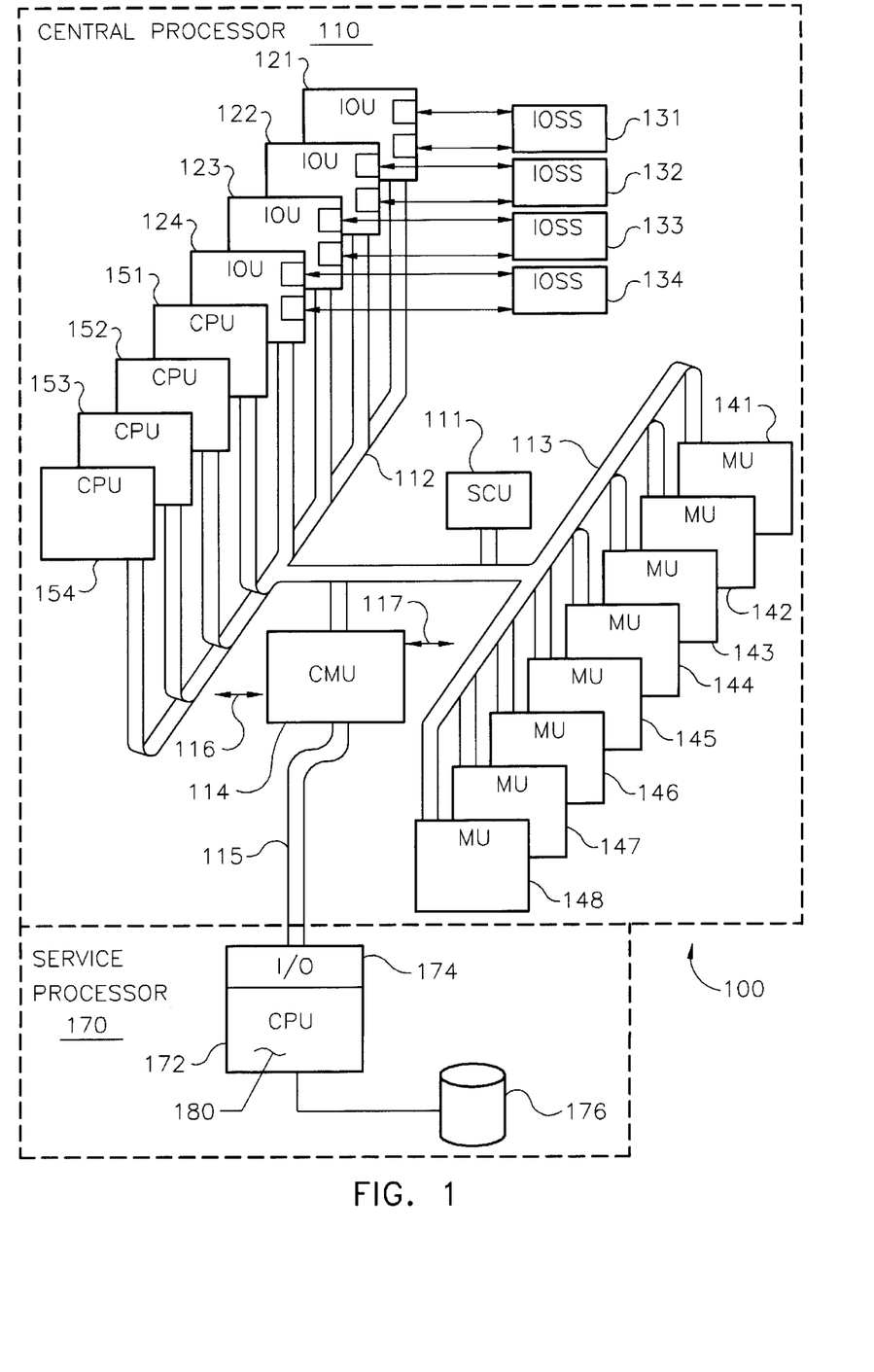
FIG. 1 is a block diagram of a computer system in one embodiment of the present invention.

FIG. 1 illustrates a system for the purpose of describing various aspects of the present invention, including fault processing with polymorphic fault objects. A system of the present invention is any electromechanical system having fault monitoring capability. For example, computer system 100 includes central processor 110 and service processor 170. Service processor 170 cooperates with central processor 110 to perform fault processing for faults occurring within central processor 110.

Central processor 110 is any conventional general purpose computer of the type having several sets of modular computing equipment. In a first set, from one to four substantially identical central processing unit modules (CPU) 151–154 cooperate by communication via system bus 112. In a second set, from one to four substantially identical input/output unit modules (IOU) 121–124 cooperate by communication via system bus 112. Each IOU services a respective member of a third set of input/output subsystem modules (IOSS) 131–134. Members of the third set provide a variety of different system functions with redundancy according to system requirements. For example, one or more IOSSs provide data storage and retrieval, printing, telecommunications, transactional I/O, user terminal I/O, or similar conventional input/output services. In a fourth set, from one to eight substantially identical memory unit modules (MU) 141–148 cooperate by communication via memory bus 113.

A system control unit (SCU) 111 governs system organization. A clock and maintenance unit (CMU) 114 governs system operation, fault monitoring, and recovery. A member of a set (CMU, MU, IOU, or IOSS) is enabled (or disabled) by CMU 114 by supplying (or removing) clocks, power, and gating signals 116 provided to all units by CMU 114. Each unit (CPU, MU, IOU, IOSS, SCU, or CMU) includes a fault monitoring circuit that provides fault signals 117 on the occurrence of any abnormal condition (for example excessive noise, any hardware failure, any out of range analog parameter, any out-of-bounds digital value, or any invalid operation in microcode, firmware, or software). CMU 114 responds to fault signals 117 and reports the identification of the unit on which the abnormal condition occurred and the type of abnormal condition by providing fault signals on bus 115 to service processor 170.

A service processor is any programmable computer that responds to fault signals with commands that enable or limit operation of any unit of a monitored system. For example, central processor 110 employs fault monitoring circuits as described above which communicate over bus 115 to service processor 170 and service processor 170 provides command signals over bus 115 to affect changes in system operation and fault monitoring by CMU 114.

Service processor 170 includes conventional input/output circuits 174 coupled by a conventional bus (not shown) to conventional central processing unit (CPU) 172. Input/output circuits may include a conventional monitor and keyboard for operator interaction with the service processor. Service processor 170 performs instructions of fault processor program 180, not shown, provided to CPU 172 by file system 176.

File system 176 is any conventional data storage device, separate or integral with CPU 172. For example, when service processor 170 is a personal computer, file system 176 includes a disk drive with removable media for receiving the program, and a disk drive with nonremovable media for fast access to the program. Such media include indicia of instructions of fault processor 180 of the present invention.

A program of the present invention is any firmware or software arranged to perform fault processing by polymorphic fault objects. For example, FIGS. 2 through 4 describe fault processor 180 performed by service processor 170.

Fault processor 180 utilizes, in some aspects, principles of object-oriented programming. Concepts and terminology used to describe fault processor 180 are intended to be consistent with current research, industry standards, and the conventions of the current major manufacturers and developers of computer systems and software. Guidance into the extensive literature that applies to the present invention is provided by: "Object-Oriented Languages, Systems and Applications," edited by Gordon Blair, et al., Halsted Press of New York N.Y., 1991; and "The Java Handbook," by Patrick Naughton, Osborne McGraw-Hill of Berkley Calif., 1996; "C++ The Complete Reference," by Herbert Schmildt, Osborne McGraw-Hill of Berkley Calif., 1995; and the bibliographic references therein.

An object oriented run-time environment is any software environment supporting run-time polymorphism, including, for example, environments characterized by direct execution and environments characterized by interpretation. Fault processor 180 in one variation is interpreted, for example, as would be the case when developed in Smalltalk or Java programming languages and interpreted by a virtual machine. In another variation, fault processor 180 is executed directly, for example, as would be the case when developed in C++ or Pascal programming languages, compiled, linked, and loaded for execution with object oriented run-time supporting routines. In the former case, the object oriented run-time environment includes a Smalltalk processor or a virtual machine implemented in hardware or software. In the latter case, the object oriented run-time environment includes linked library routines.

Run-time polymorphism is accomplished in any conventional run-time environment having dynamic binding. Whereas static type checking and static binding are accomplished during compile-time, reassignment of data types and dynamic binding are accomplished during run-time.

Run-time polymorphism may be better understood in light of the following brief overview of object-oriented programming concepts, including classes, objects, interfaces, and polymorphism. A class is any template used to define one or more objects. A class is defined using the syntax of an object oriented programming language (source code) and specifies at least three types of components: variables, methods that operate on variables, and interfaces.

Figure 2:
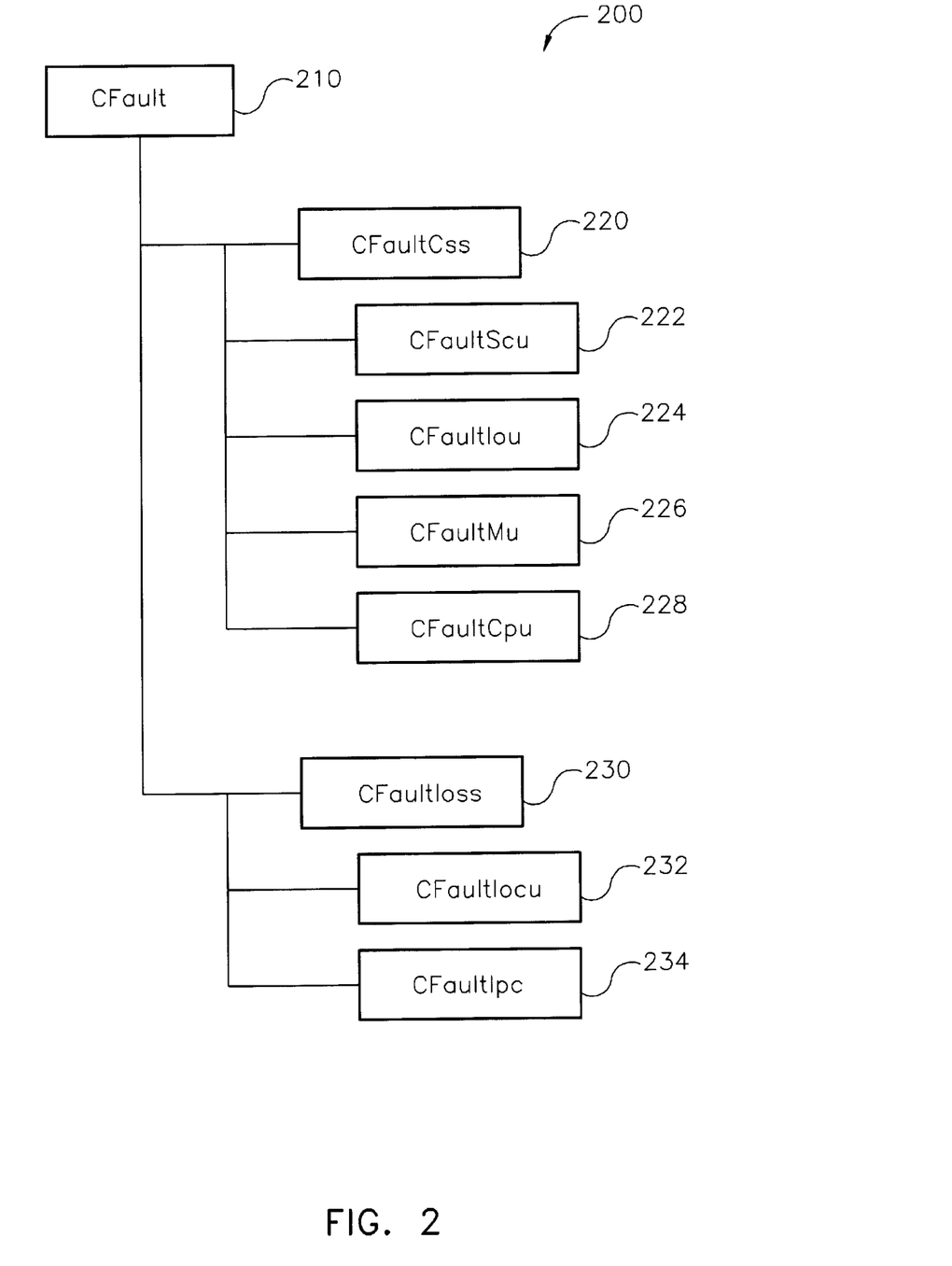
FIG. 2 is a hierarchy diagram of derived classes according to one embodiment of the present invention.

Fault classes are conventionally defined in a hierarchy, as shown for example in hierarchy diagram 200 for fault processor 180 in FIG. 2. Fault class CFault 210 specifies variables, methods, and interfaces common to all fault objects in fault processor 180. Classes CFaultCSS 220 and CFaultIOSS 230 distinguish computing subsystem fault processing from input/output subsystem fault processing and provide variables, methods, and interfaces common only to each respective subsystem. Additional fault classes 222–228 and 232–234 provide variables, methods, and interfaces particular to fault processing for similarly named functional units of computer system 100.

A fault object is any instance of a fault class from which it was defined. As illustrated in the exemplary run-time memory map of FIG. 3, fault objects 352–356 come into existence by instantiation during run-time. Instantiation involves allocation and initialization of data memory 304 for the storage of variables and pointers for each fault object. Pointers identify entry points 336, 338, 348 in program memory for appropriate methods, i.e. operations on the variables. The specification of an object (class source code) defines immutable aspects of data members and member functions for fault objects in the fault class. The instantiation of a fault object, on the other hand, includes instance variables for the changing values and attributes of data members and (variable) pointers to entry points for the member functions. The compiler, interpreter, or virtual machine constructs one or more conventional data structures for convenient access to objects and their members.

Figure 3:
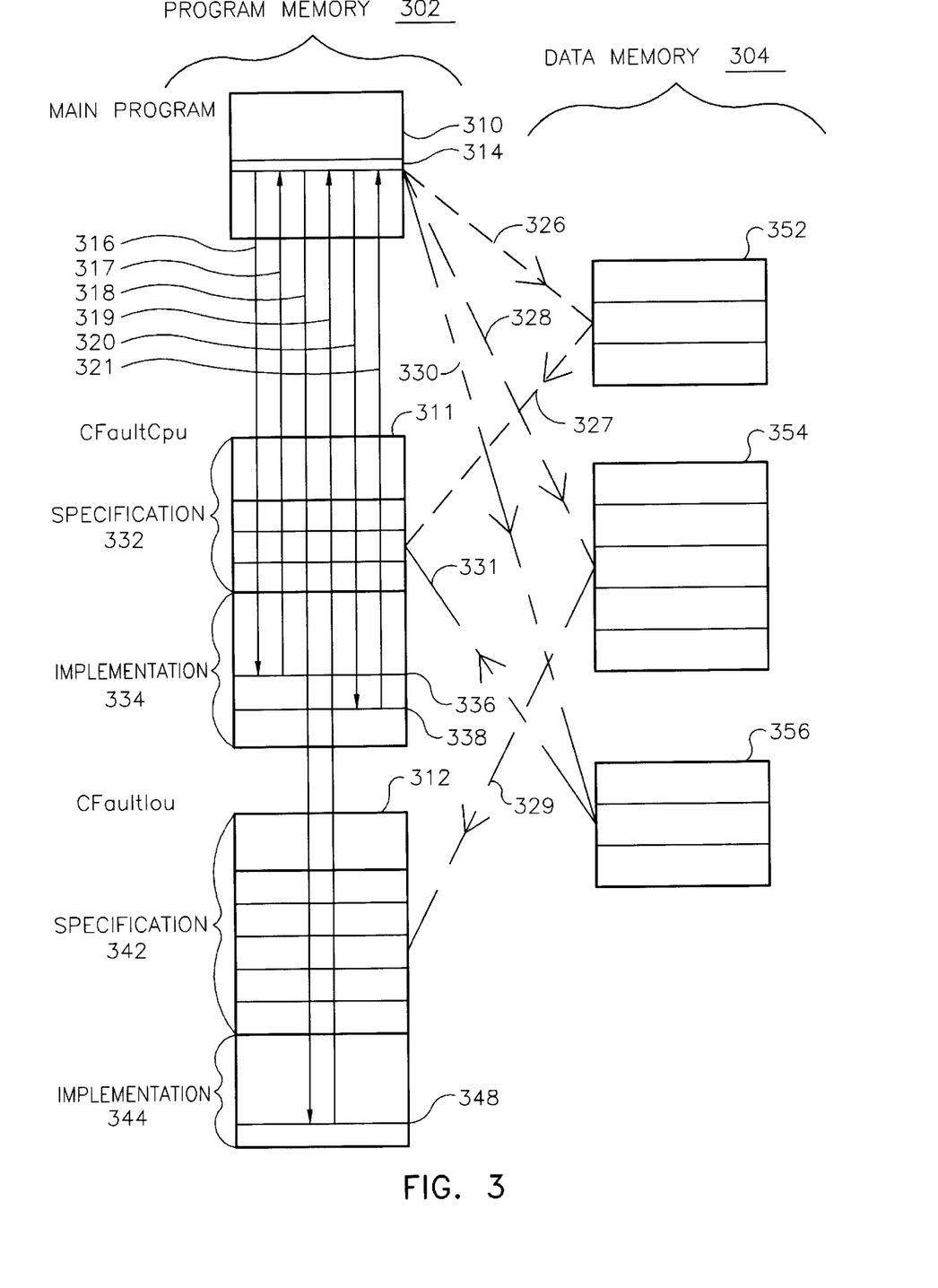
FIG. 3 is an exemplary run-time map of memory utilization during fault processing according to the present invention.

The run-time map of FIG. 3 illustrates memory utilization during run-time fault processing according to fault processor 180. At the instant in time shown, program memory 302 includes instructions for main program 310 and constants and instructions for class CFault. For clarity of presentation, only those constants and instructions for derived classes CFaultCPU 311 and CFaultIOU 312 are shown. Data memory 304 includes three fault objects 352, 354, 356 instantiated in response to fault signals received by service processor 170 from CMU 114. Each fault object 352, 354, and 356 is instantiated according to the fault determined and reported by CMU 114. A fault class template may be used to instantiate several objects and each fault object will include its individual instance variables and its individual pointer values.

Any association of a particular method with an object is called binding. Binding, when accomplished at least in part at run-time is called dynamic binding. For example, an indirect call through a virtual function table accomplishes dynamic binding as set forth in the proposed ANSI standard C++ programming language.

A fault class defines a method by defining a specification 332, 342 for the method and an implementation 334, 344 for the method. The specification includes a name for the method, the names and types of its arguments, the type of its return value (if any), and provisions for exceptional conditions which may arise when the method is performed (such as overflow, etc.). The implementation of a method (e.g. executable code) has one or more entry points, i.e. memory addresses from which execution will commence. When the specification is not accompanied by an implementation, the method is called a virtual function.

An interface is any class having conventional member functions without corresponding implementations. Objects defined in classes that derive from an interface cooperate at run-time via pointers collectively called a virtual function table. In some run-time environments, a virtual function table is one of the data structures that is allocated when an object is instantiated. A virtual function table includes pointer variables for entry point values determined at run-time, pointer constants when offsets to entry points can be predicted at compile-time, or a combination of variables and constants.

When execution of a program reaches a particular call to a function, an object having the function is instantiated with allocations and values from the hierarchy of classes from which that object was defined. The instantiation proceeds with reference to the signature of the function, which includes the name of the function, the parameter values to be passed, the parameter types, and the expected return value type. One process of dynamic binding (which accompanies instantiation), at least in concept, involves comparing the signature of the method in turn to methods known privately by the object, methods known within the class in which the object is defined, and methods of parent classes in the hierarchy. The pointer identifying the appropriate method for this particular instantiation of the object is associated (dynamically bound) with an entry point of the first method having a specification compatible with the signature. Such a pointer value is stored, for example, in a virtual function table of the object. Another process of dynamic binding involves determining an entry point value for a pointer with reference to pointer values in a virtual function table.

A fault class facilitates polymorphism by facilitating method overloading, method overriding, and method inheriting. When a class specifies methods of the same name but with varying argument types, the method name is said to be overloaded. When a derived class specifies a method of the same signature as the parent, the method implementation in the derived class overrides the parent implementation. When a derived class omits the implementation of a method and thereby relies on the implementation of a method in a parent class, the parent class implementation is said to be inherited by the derived class.

A polymorphic fault object is any object having a polymorphic member function. A polymorphic function is a function exhibiting method overloading, method overriding, or method inheritance. When classes are derived from an interface, objects in the derived classes ordinarily have polymorphic member functions.

The exemplary memory map of FIG. 3 provides an illustration of a conventional process of dynamic binding as further applied to polymorphic fault objects. At instruction 314 of main program 310, a step of the system shut down process is to be performed. In that step, a report of the unique register contents (i.e. a memory dump) for each failing unit is to be produced. Because the details of such a report vary with the type of unit, separate methods are appropriate. However, the report function is needed for all fault objects and so is defined as part of an interface of class CFault. Each derived class or a derived class thereunder contains an implementation for the report function named DumpHardware. Consequently, each polymorphic fault object 352–356 has a virtual function table data structure in data memory 304.

Instruction 314 is part of a loop that is performed once for each fault object. Instruction 314 is performed three times with three unique consequences. A conventional linked list, or similar structure (not shown) identifies fault objects 352–356 for processing. In the first performance, a fault object 352 is passed as a parameter to be reported according to the interface. Prior to transferring program control to the appropriate method, the dynamic binding process of the run-time environment is called. During dynamic binding, the signature portion of fault object 352 is compared to the specification portion 332 of fault class CFaultCPU 311, as indicated by relations 326 and 327. Specification portion 332 includes the specifications for base fault classes CFaultCSS and CFault (not shown). The specification of each method having the name DumpHardware is considered until a match is found. Consequently, a pointer to entry point 336 is assigned in object 352. Thereafter, program control transfers on the basis of the pointer value from instruction 314 to entry point 336 on flow path 316 and returns to the instruction following instruction 314 on flow path 317.

In the second performance of instruction 314, fault object 354 is passed as a parameter to be reported according to the CFault interface. Prior to transferring program control to the appropriate method, the dynamic binding process of the run-time environment is called. During dynamic binding, the signature portion of fault object 354 is compared to the specification portion 342 of fault class CFaultIOU 312, as indicated by relations 328 and 329. Specification portion 342 includes the specifications for base fault classes CFaultIOSS and CFault (not shown). The specification of each method having the name DumpHardware is considered until a match is found. Consequently, a pointer to entry point 348 is assigned in object 354. Thereafter, program control transfers on the basis of the pointer value from instruction 314 to entry point 348 on flow path 318 and returns to the instruction following instruction 314 on flow path 319.

In the third performance of instruction 314, fault object 356 is passed as a parameter to be reported according to the CFault interface. For the sake of example, assume that the argument types of the signature of fault object 356 differ from the signature of fault object 352. Prior to transferring program control to the appropriate method, the dynamic binding process of the run-time environment is called. During dynamic binding, the signature portion of fault object 356 is compared to the specification portion 332 of fault class CFaultCSS 311, as indicated by relations 330 and 331. Specification portion 332 includes the specifications for base fault classes CFaultCSS and CFault (not shown). The specification of each method having the name DumpHardware is considered until a match is found. Consequently, a pointer to entry point 338 is assigned in object 356. Thereafter, program control transfers on the basis of the pointer value from instruction 314 to entry point 338 on flow path 320 and returns to the instruction following instruction 314 on flow path 321.

Dynamic binding of fault objects 352 and 356 illustrates a result of method overloading in class CFaultCPU. Different entry points are dynamically bound because the passed parameter in object 352 is of a different type than the passed parameter in object 356. In an alternate organization of fault processor 180, all report functions are overloaded in the same class and the passed parameter operates to identify the appropriate routine through dynamic binding.

In a preferred implementation of fault processor 180, the overhead of signature comparison is avoided by calculating the appropriate entry point value using values from a virtual function table that is initialized upon instantiation of the calling object.

Dynamic binding of fault object 354 illustrates several ways to reduce the cost of maintaining fault processor 180 as it evolves. Fault processor 180 is expected to evolve to incorporate support for additional fault signals from known unit types and for support for new unit types. If, for example, fault object 354 was of a type not accommodated in a prior release of fault processor 180 and class CFaultIOU was, therefore, absent from that release, then addition of support for an IOU unit type merely involved the definition of a fault class without change to instruction 314 of main program 310 or to existing fault classes CFault 311 or CFaultCSS, not shown.

In general, to accommodate additional fault signals, one or more of several approaches may be used: (a) expand an existing fault class which already supports a very similar specification; (b) define a derived fault class and inherit or override functions for the interface; or (c) define a new fault class with the same interface as CFault and either prepare new functions or invoke behavior sharing either with ad hoc references to functions of other classes or with conventional containment and aggregation techniques. In each of these approaches main program instructions such as instruction 314 and implementations 334 and 344 for existing classes are outside the scope of change. The reliability of existing fault processing capabilities is not compromised by the scope of change. Because the scope of testing the revised fault processor is limited to the scope of change, costs for testing are also reduced.

Fault processing according to the present invention is accomplished by any number of processing threads on any number of platforms. For example, fault processor 180, in one variation, is performed as a single thread process by a single CPU 172 of service processor 170. In an alternate variation (not shown), fault processing responsibilities including recording the fact of fault detection, analyzing the event giving rise to the fault, and treating the condition are divided or redundantly performed on one or more platforms according to the present invention and conventional multitasking, multi-platform programming techniques.

Figure 4:
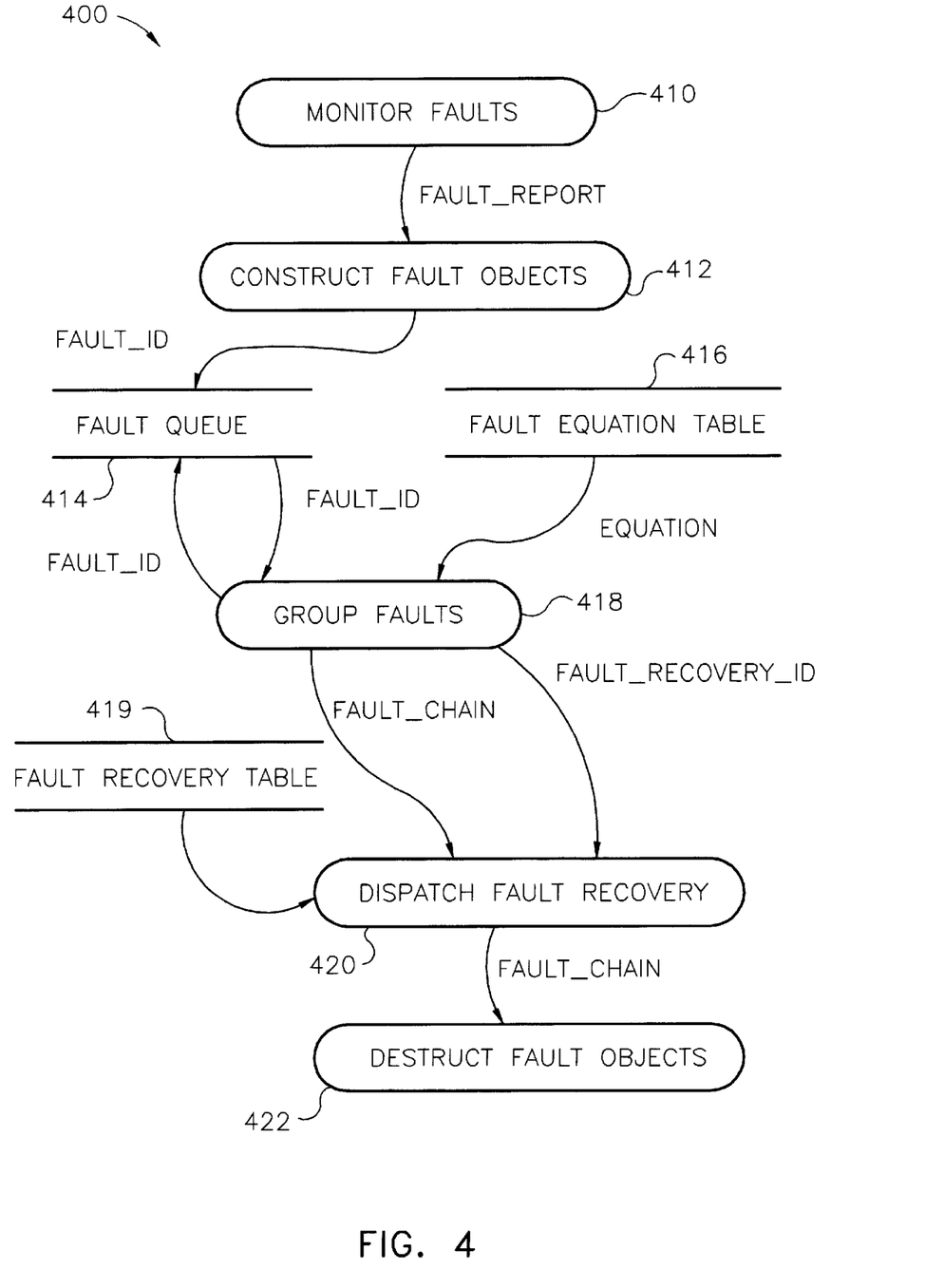
FIG. 4 is a data flow diagram for a fault processing method in one embodiment of the present invention.

The data flow diagram of FIG. 4 describes a fault processing method 400 without reference (or limitation) to the number of threads, the number of platforms, or the extent of parallel processing used for a particular implementation. In the diagram, process steps (i.e. independent possibly parallel tasks) are illustrated in ovals. Arrows indicate data produced in the performance of each step. In the following description, reference is made, for clarity of presentation, to fault processor 180 operating as part of system 100.

The data and procedures used to perform method 400 include any programming language with polymorphism and suitable data structures for entry points. For example, an illustrative embodiment of the "RFH" program in the C++ programming language is described in the Appendix. Material in the Appendix was selected and organized to facilitate description below rather than meet the rigorous specifications of a particular compiler and development environment.

In the "Type Definitions" section of the Appendix, several types for data structures are defined. A REV, as identified in the MSG structure type definition, is a "Report of Event" (fault_report in FIG. 4). An MSG structure is a conventional message structure for queuing messages in an operating system such as the Windows™ operating system marketed by Microsoft, Redmond Wash.

Structure type T_BASICRFHRECORD defines the parameter type used generally for a parameter passed to a polymorphic fault object. The data type CFault* (fault_id in FIG. 4) is a pointer to a polymorphic fault object. Pointer pNext links fault object instances of the type CFault together (fault_chain in FIG. 4).

Structure type T_RFHGLOBAL includes operating conditions for RFH. RFH receives control (is instantiated and begins processing) on the occurrence of any fault_report. RFH continues in control to collect additional fault_reports that occur close in time to the first fault reported. RFH (expert) provides more accurate recovery actions based on a group of fault_reports than possible on the basis of isolated individual fault_reports.

Structure type T_RFHEQUATIONS defines the array element type used in struc_RFHEQTb1[D_RFHEQTBLSZ] (fault equation table 416). This table is of the type described in U.S. Pat. No. 5,220,662 to Lipton.

Structure type T_RFHL2TBLENTRY defines the array element type used in struc_RFHL2Tb1[D_RFHL2TBLSZ] (fault recovery table 419). Each array element associates a pointer to a particular recovery procedure with a type of fault. All procedures pointed to in this table conform to the interface defined in class CFault. By dynamic binding, an appropriate method of a polymorphic fault object is executed when transfer of control is made through a pointer in this table.

Structure type T_ORUOBJECTS defines an element for a linked list of optimal replaceable units. In the event that a fault recovery process will involve more than one unit, the plurality of units is identified in a linked list for further processing.

In the "Data Items" section of the Appendix, declarations and initializations are illustrated. Fault queue 414 is shown of the type CObList, a class of the type having conventional queue processing member functions such as the CObList class defined in Microsoft Foundation Classes (MFC) marketed by Microsoft. Fault queue 414 is any circular list having a head and a tail. Items are removed from the head and, if desired, are returned to the tail. Items are removable from the middle of the queue, as well.

Fault equation table 416 is initialized with faults sufficient for clearly teaching the practice of the invention. A fault handling processor similar to RFH for all types of faults that might occur on system 100 would include perhaps over 100 fault equations utilizing perhaps over 50 fault types.

Fault recovery table 419 is initialized with pointers to two recovery procedures, consistent with fault equation table 416. A fault handling processor similar to RFH for all types of faults that might occur on system 100 would be initialized with pointers to one or more fault recovery procedures for each fault equation.

In the "Classes and Interfaces" section of the Appendix, classes corresponding to classes 210, 220, 226, and 228 in FIG. 2 are defined. One or more constructors for each class are declared in the body of the class definition. In class CFault 210, a list of virtual functions define an interface to which derived classes 220, 226, and 228 conform. Note that the implementation in CFaultCSS 220 of GotoSystemDisaster( ) is inherited by objects of the class CFaultCPU 228. Note, also that all members of class CFaultCSS 220 have a commonly named polymorphic member function, ReleaseUnit( ). Being commonly named provides a mechanism for dynamic binding. At run-time, unique release operations are performed for each different unit of the computing subsystem (CSS), including CPU, IOU, MU, and SCU units as in FIG. 1, when control is transferred via dynamic binding to an appropriate ReleaseUnit member function.

Class CBRFHWindow illustrates support for program evolution. The original class CBodyXMSWindow is derived from a conventional graphical user interface class such as the MFC CFrameWnd class provided by Microsoft. Additional methods are added in the class definition shown in the Appendix to provide further operations for fault processing.

In the "Member Functions" section of the Appendix, a skeleton set of member functions is defined in an order selected for clarity of presentation. Where a function is not defined in detail, conventional implementations of the operations implied by the name of the function are intended. Functions having names prefixed with "LXSYS_" implement the operations of similarly named functions of the type provided by Microsoft in the Windows™ operating system. The variation from the standard Windows function employs conventional event driven software techniques suitably made to comply with the conventional hardware of service processor 170 and bus 115.

The description of method 400, below, describes operations at a time after an arbitrary portion of system 100 has generated a fault signal. This introductory fault signal has occurred after a period of time wherein no fault signals were being processed. In response to this introductory fault signal, RFH has been instantiated and is actively executing, though the introductory fault is held for processing. The contents of the memory portion of CPU 172 contains data structures with the values as described above.

At step 410, an event driven service routine continues to monitor input/output circuits 174 for receipt of additional fault signals from bus 115. For example in the Appendix, the function CBRFHWindow::ProcessFault has called the function CBRFHWindow::PollEvents which is executing the call to function Wait(P_wCollectionTime).

The fault signals received by input/output circuits 174 are provided in any convenient form to CPU 172. On receipt, structures of the type MSG are enqueued. The function LXSYS_PeekThisMessage executes on lapse of the collection time and assigns a pointer (&msg) to a structure of the type MSG as it is removed from the message queue.

At step 412, received fault reports are used to create polymorphic fault objects. Fault objects are defined in the CFault class hierarchy discussed with reference to FIG. 2, above. According to the example in the Appendix, function LXSYS_GetAtomIndex determines field wEventID according to the unit reporting the failure. Then, an appropriate constructor in MakeFaultObject copies values from the region of memory identified by handle P_msg.lparam (also known as the REV or fault_report) to a region of memory of the type T_BASICRFHRECORD named strucFltRecord. In this example, we assume that the introductory fault and one or more additional faults were originated by CPU 154 of FIG. 1. The wEventID field of strucFltRecord identifies the CSS as the originator of the fault signal. Further identification of the fault signals is performed by function BRFH_AnalyzeCSSFault based on fields cbClass and cbSubclass. On review of the field iObjectType assigned by BRFH_AnalyzeCSSFault, MakeFltObject performs the appropriate constructor using the keyword "new". A reference to each fault object is then placed in fault queue 414.

Fault queue 414 is any data structure providing temporal buffering so that fault recovery can be based on faults that occur close in time. Buffering provides the opportunity to analyze sequential and repeated faults to better assess an approach to recovery from the abnormal condition.

At step 418, fault objects consistent with a recovery process are identified and grouped by any convenient method. In a preferred method, fault queue 414 is expected to include faults of more than one ultimate cause. In one example of such a scenario, a CPU failure causes a burst of failure reports intermixed with a burst of failure reports caused by a simultaneous and unrelated IOSS failure. A chain of faults (fault_chain), corresponding to the burst related to the CPU failure, for example, is formed and a recovery process is identified (fault_recovery_id).

In the implementation of the method illustrated in the Appendix, control returns from function MakeFltObject to function PollEvents and then to function ProcessFault, after construction of objects corresponding to fault signals received during the collection time. Grouping is accomplished with reference to equations from fault equation table 416 in the manner described in U.S. Pat. No. 5,220,662 to Lipton, incorporated herein by this reference. Faults that are determined to be consistent with an identified recovery process are eventually removed from fault queue 414.

In function ProcessFault, a while-loop is entered for selecting objects from fault queue 414. On each loop, a call is made to function Expert. Function Expert identifies fault objects consistent with one cause. Function Expert first scans fault queue 414 in its entirety to build array w_FaultArray. This array is then passed to function LBEA_FindFirstMatch, along with a reference to fault equation table 416. As a result of matching the array of faults to equations from the table, a value is assigned to the local variable wFltType, and a subset of queued faults is identified for linking. Linking to form a fault_chain is accomplished by pointing pointer rFltRecord.pNext in the last fault object on the chain to the next fault object to be added to the chain.

The completed chain (fault_chain) and local variable wFltType (fault_recovery_id) are passed to the next process step.

At step 420, fault recovery is dispatched for all fault objects identified by the fault_chain. Dispatch is accomplished by any convenient method. In a preferred method, the local variable wFltType is used as an index into fault recovery table 419. A binary search of the table is implemented in function Expert after the fault_chain has been formed. The indexed line of fault recovery table 419 includes a pointer to a recovery function as described above with reference to structure type T_RFHL2TBLENTRY. Because each fault object conforms to the CFault interface, polymorphic methods accomplish standard functions in ways particular to each identified object.

Beneficial effects of dynamic binding for polymorphic fault objects can be better appreciated from an example of CPU failure. Consider the case wherein function MakeFltObject has constructed a CFaultCPU object. Later, function Expert has identified the BRFH_RecoveryJupiterCPU recovery process for dispatch. When the system is not configured as a system having redundant multiple CPUs, a function call of the form pCpuFltObject->GotoSystemDisaster( ) is made from function BRFH_RecoverJupiterCPU for the purpose of orderly shutdown. Since class CFaultCPU does not include an implementation of GotoSystemDisaster( ), the parent function is inherited.

Function CFaultCss::GotoSystemDisaster( ) first identifies the releasable units (CPU, MU, IOU, IOSS, and SCU) currently operating by calling function BRFH_MakeCssOruList. When a unit is released, it is operationally removed from System 100, i.e. its functions and cooperation are limited partially or completely. A for-loop provides a release step to be performed uniquely for each unit identified by a fault object in strucORUObjects. The loop accomplishes a release for each unit by transferring control to a polymorphic release function of each unit. The structure of this for-loop is independent of the units being released. Different units require unique operations to accomplish release, as illustrated by CFaultCPU::Release and CFaultMU::Release functions described in the Appendix. Dynamic binding associates the proper release function with each iterative call within the for-loop at run-time.

At step 422, fault objects identified on the fault_chain are destructed to return allocated memory back to the system for reuse. For example, for the method described in the Appendix, the recovery process returns to function Expert where the function DelFltObject is called. The function DelFltObject is passed the head of the fault_chain from which it can deallocate memory for each chained fault object, beginning with the last fault object in the chain. Control then returns to function PollEvents and then to the event driven operating system routine responsible for terminating execution of this instantiation of fault processor RFH.

```
100     // // // // // // // TYPE DEFINITIONS
101     typedef struct / see Microsoft WIN31WH.HLP
102         {
103         HWND hwnd;  // handle of fault processor's operating window
104         UINT message;
105         WPARAM wParam;
106         LPARAM lParam;      // identifies REV
107         DWORD time;
108         POINT pt;
109         } MSG;
110     typdef struct
111         {
112         HANDLE hRev;    // REV used in object constructor
113         WORD wEventId;  // identifies unit providing fault message
114         BYTE cbType;
115         BYTE cbSystem;
116         BYTE cbUnit;
117         BYTE cbClass;       // identifies fault type
118         BYTE cbSubClass;        // further identifies fault type
119         int   iObjectType;
120         WORD wFlags;
121         WORD wFaultType;
122         WORD wFaultMsg;
123         WORD wSysAlarmNum;
124         CFault* pNext;    // links fault objects into fault chain
125         }T_BASICRFHRECORD;
126     typedef struct
127         {
128         WORD hWnd;
129         CBRFHWindow* pMainWindow;
130         CFault* pCurrentFaultObject;
131         DWORD dwCleanupFlags;
132         DWORD dwOptions;
133         WORD wInitialCollectionTime;    // time in seconds for faults to collect
134         WORD wFaultThreshold;
135         WORD wThresholdPeriod;
136         WORD wOpeType;
137         }T_RFHGLOBAL;
138     typedef struct
139         {
140         WORD wEntry[D_EQLINESZ];
141         } T_RFHEQUATIONS;
142     typedef struct
143         {
144         WORD wFltType;
145         WORD (FAR PASCAL *pfnRecoverX) (CFault&);
146         } T_RFHL2TBLENTRY;
147     typedef struct
148         {
149         CFault* pObj[D_MAXORUREC];
150         } T_ORUOBJECTS;
151     typedef T_ORUOBJECTS FAR* T_LPORUOBJECTS;
152     // // // // // // // DATA ITEMS
153     COblist oblist_FaultQueue(30);
154     CBRFHWindow* p_MainWnd;
155     WORD FAR PASCAL BRFH_RecoverJupiterCPU ( CFault& P_rFltObject );
156     WORD FAR PASCAL BRFH_RecoverSysDisaster ( CFault& P_rFltObject );
157     T_RFHGLOBAL struc_RFHGlobal;
158     T_RFHEQUATIONS struc_RFHEQTbl[D_RFHEQTBLSZ] =
159         {
160         {D_F3100,0x0301,D_F31C1,DSP_AND,D_F31C0,
161             DSP_END,0,0,0,0,0,0,0,0,0,0,0,0,0,0,0,
162             0,0,0,0,0,0,0,0,0,0},
163         {D_F3100,0x0101,D_F31C1,     // fatal CPU error
164             D_F3100,0x0101,D_F31C0,    // non-fatal CPU error
165             D_F3100,0x0101,D_F31C2,    // parity error on SSP
166             D_F3100,0x0101,D_F31C3,    // DIAG TAG 0 - BPU Freeze
167             D_F3100,0x0101,D_F31C4,    // DIAG TAG 21
168             D_F3100,0x0101,D_F31C5,    // address trap
169             D_F3100,0x0101,D_F31C6,    // DIAG TAG 0 - Fault on Fault
170             D_F3100,0x0101,D_F31CD,    // ONC Event
171             D_F3100,0x0101,D_F31CE,
```

-continued

```
172             DSP_OR,D_F31CF,          // unexpected events
173             DSP_END,0,0},
174         {D_FC000,0x0F01,D_F11E0,DSP_OR,
175             D_F11E1,DSP_OR,D_F4145,DSP_OR,
176             D_F6135,DSP_OR,D_F61F1,DSP_OR,
177             D_F61F2,DSP_OR,D_F6134,DSP_OR,
178             D_F1800,
179             DSP_END,0,0,0,0,0,0,0,0,0,0,0,0,0,},
180         {D_FC000,0x1301,D_F5154,DSP_OR,
181             D_F5156,DSP_OR,D_F515C,DSP_OR,
182             D_F41F1,DSP_OR,D_F41F2,DSP_OR,
183             D_F41F8,DSP_OR,D_F41FE,DSP_OR,
184             D_F61F6,DSP_OR,D_F61F7,DSP_OR,
185             D_F61F8,
186             DSP_END,0,0,0,0,0,0,0,0,0,0}
187         };
188     T_RFHL2TBLENTRY struc_RFHL2Tb1 [D_RFHL2TBLSZ] =
189         {
190         {D_F3100, BRFH_RecoverJupiterCPU},
191         {D_FC000, BRFH_RecoverSysDisaster};
192         };
193     DSP_CB0UNITNBR = 101;
194     IDSSP_EVCS00 = 0;
195     IDSSP_EVCS03 = 1;
196     D_F0002 = 0x0002; / unknown fault
197     D_F1001 = 0x1001;
198     D_F1002 = 0x1002;
199     D_F1003 = 0x1003;
200     D_F3100 = 0x3100;
201     D_FC000 = 0xC000;
202     D_CSSOTYPCPU = 1011;
203     D_CSSOTYPMU = 1012;
204     D_RFHL2TBLSZ = 8192;
205     D_EQLINESZ = 128;
206     DSP_DONE = 0;
207     DSP_ENDTABLE = 8192 - 128;
208     DSP_SYMUSED = 1;
209     // // // // // // // CLASSES AND INTERFACES
210     class CFault : public COBject
211     {
212     public:
213         CFault( );
214         CFault(T_BASICRFHRECORD& P_rFltRecord);
215         virtual BOOL ReleaseUnit( )=0;
216         virtual void DumpHardware(void)=0;
217         virtual void GotoSystemDisaster( ) = 0;
218         virtual ~CFault( );
219     protected:
220         T_BASICRFHRECORD m_FltRecord;
221     }
222     class CFaultCss : public CFault
223     {
224     public:
225         CFaultCss( );
226         CFaultCss(T_BASICRFHRECORD& P_rFltRecord);
227         void DumpHardware( );
228         void DumpHardware(TSP_LPHWDUMPLIST P_lpList);
229         void GotoSystemDisaster( );
230     }
231     class CFaultCPU : public CFaultCss
232     {
233     public:
234         CFaultCPU( );
235         CFaultCPU(T_BASICRFHRECORD& P_rFltRecord);
236         BOOL ReleaseUnit(void);
237         void DumpHardware(void);
238     }
239     class CFaultMU : public CFaultCss
240     {
241     public:
242         CFaultMU( ):CFaultCss( ) { }   // default constructor
243         CFaultMU(T_BASICRFHRECORD& P_rFltRecord):
244             CFaultCss(P_rFltRecord)    { }
245         BOOL ReleaseUnit( );
246         const BYTE GetUnitNum( ) {return(m_FltRecord.cbUnit -
247             DSP_MU0UNITNBR);}    // returns MU number
248         BOOL CheckMultiUnit(void);
249         void ClearMemoryErrors( );
250         ~CFaultMU( ) { }
251     };
```

```
252   class CBRFHWindow : public CBodyXMSWindow
253   {
254   public:
255       CBRFHWindow(char* P__szVersion);
256       WORD ProcessFault (WORD P__wCollectionTime);
257       WORD PollEvents (WORD P__wCollectionTime =
258           DSP__MINCOLLECTIONTIME);
259       BOOL IsFault(MSG P__msg);
260       void Expert (void);
261       WORD EnQueue(CFault* P__pFltObject);
262       CFault* DeQueue(void);
263       void DelFltObject (CFault* P__pFltObject);
264   }
265   class CFactory : public CObject
266   {
267   public:
268       CFactory( ) { }
269       virtual ~CFactory( ) { }
270       CFault* MakeFltObject(MSG P__msg);
271   }
272   // // // // // // // MEMBER FUNCTIONS
273   WORD CBRFHWindow::ProcessFault (WORD P__wCollectionTime)
274   {
275   WORD wStatus = 0xFFFF;
276   wStatus = PollEvents(P__wCollectionTime);
277   while (!oblist__FaultQueue.IsEmpty( ))
278       {
279       Expert( );
280       if (oblist__FaultQueue.IsEmpty( ))
281           wStatus = PollEvents(DSP__MINCOLLECTIONTIME);
282       }
283   return(0);
284   }
285   WORD CBRFHWindow::PollEvents (WORD P__wCollectionTime)
286   {
287   BOOL bMsgExists;
288   WORD wStatus;
289   MSG msg;
290   Wait(P__wCollectionTime);
291   while (bMsgExists=LXYS__PeekThisMessage(&msg,
292       (HWND)struc__RFHGlobal.hWnd,
293       WM__DDE__DATA, WM__DDE__POKE,0, 0, 0, DSP__MESS__REMOVE))
294       {
295       if(IsFault(msg))
296           {
297           CFault* pFltObject = p__Factory—>MakeFltObject(msg);
298           wStatus = EnQueue(pFltObject);
299           }
300       }
301   return(0);
302   }
303   CFault* CFactory::MakeFltObject(MSG P__msg)
304   {
305   T__BASICRFHRECORD strucFltRecord;
306   CFault* pFltObject = NULL;
307   strucFltRecord.WEventId = LXSYS__GetAtomIndex( HIWORD( P__msg.lParam
308   ));
309   if((strucFltRecord.wEventId >= IDSSP__EVCS00) &&
310       strucFltRecord.wEventId <= IDSSP__EVCS03))
311       {
312       BRFH__AnalyzeCSSFault(strucFltRecord);
313       switch(strucFltRecord.iObjectType);
314           {
315       case D__CSSOTYPCPU:
316           pFltObject = new CFaultCPU(strucFltRecord);
317           break;
318       case D__CSSOTYPMU:
319           pFltObject = new CFaultMU(strucFltRecord);
320           break;
321       ...construct objects for other types of faults...
322           }
323       }
324   else
325       {
326       ...analyze and construct objects from other unit types...
327       }
328   return (pFltObject);
329   }
330   void FAR PASCAL BRFH__AnalyzeCSSFault(T__BASICRFHRECORD&
331   P__rFltRecord)
```

```
332     {
333     WORD wFltType;
334     switch p__FltRecord.cbClass
335         {
336     case 0x01:
337         wFltType = D__F1001;
338         P__rFltRecord.wFaultType = wFltType;
339         p__rFltRecord.iObjectType = D__CSSOTYPCPU;
340         break;
341     case 0x02:
342         wFltType = D__F1002;
343         P__rFltRecord.wFaultType = wFltType;
344         p__rFltRecord.iObjectType = D__CSSOTYPMU;
345         break;
346         ...etc...
347         }
348     return;
349     }
350     void CBRFHWindow::Expert (void)
351     {
352     INT i, iNumFaults;
353     WORD wStatus, wFltType;
354     DWORD dwResults;
355     CFault* pFltObject, pFirstFault, pCurrentFault;
356     for (i = 0; i < iNumFaults; i++)
357         {
358         pFltObject = DeQueue( );
359         T__BASICRFHRECORD& rFltRecord =
360             pFltObject—>GetFltRecord( );
361         w__FaultArray[i+1] = rFltRecord.wFaultType;
362         EnQueue(pFltObject);
363         w__FaultArray[0]++;
364         }
365     dwResults = LBEA__FindFirstMatch ((LPWSTR)& w__FaultArray[0],
366         (LPWSTR)& struc__RFHEQTbl[0].wEntry[0]);
367     if((LOWORD(dwResults) == DSP__DONE) ||
368         (LOWORD(dwResults) == DSP__ENDTABLE))
369         {
370         wFltType = HIWORD(dwResults);
371         pFirstFault = NULL;
372         bFound = FALSE;
373         i = 0;
374         while (!bFound && (i < iNumFaults))
375             {
376             pFltObject = DeQueue( ); // pull from front
377             if (w__FaultArray[i+1] != DSP__SYMUSED)
378                 {
379                 EnQueue(pFltObject); // rtn to end
380                 i++;
381                 }
382             else
383                 {
384                 bFound = TRUE;
385                 pFirstFault = pFltObject;
386                 i++;
387                 }
388             }
389         pCurrentFault = pFirstFault;
390         while (i < iNumFaults)
391             {
392             pFltObject = DeQueue( );        // off the front
393             if (w__FaultArray[i+1] != DSP__SYMUSED)
394                 {
395                 EnQueue(pFltObject); // on the end
396                 i++;
397                 }
398             else
399                 {
400                 T__BASICRFHRECORD& rFltRecord =
401                     pCurrentFault—>GetFltRecord( );
402                 rFltRecord.pNext = pFltObject;
403                 pCurrentFault = pFltObject;
404                 i++;
405                 }
406             }
407         iTop = 0;
408         iBottom = D__RFHL2TBLSZ − 1;
409         do
410             {
411             wIndex = (iTop + iBottom)/2;
```

-continued

```
412             if(wFltType > struc_RFHL2Tbl[wIndex].wFltType)
413                 iTop = (int)wIndex + 1;
414             else
415                 iBottom = (int)wIndex - 1;
416             } while ((iTop <= iBottom) &&
417                 (struc_RFHL2Tbl[wIndex].wFltType != wFltType));
418         if (LOWORD(dwResults) == DSP_ENDTABLE)
419             pFirstFault = DeQueue( );
420         if(struc_RFHL2Tbl[wIndex].wFltType != wFltType)
421             wIndex = D_F0002; /* unknown */
422         wStatus =
423         (*(struc_RFHL2Tbl[wIndex].pfnRecoverX))((CFault&)*pFirstFault);
424         struc_RFHGlobal.pCurrentFaultObject = NULL;
425         DelFltObject (pFirstFault);
426         }
427     return;
428     }
429     WORD FAR PASCAL BRFH_Recover JupiterCPU(CFault& P_rFltObject)
430     {
431     CFault* pChainedFlt;
432     CFaultCPU* pCpuFltObject = (CFaultCPU*)&P_rFltObject;
433     T_BASICRFHRECORD & rFltRecord = pCpuFltObject—>GetFltRecord( );
434     switch (rFltRecord.wFaultType)
435         {
436     case: D_F31C0
437         pChainedFlt = pCpuFltObject—>GetChainedFault( );
438         if(pChainedFlt != NULL)
439             {
440             pCpuFltObject—>PrintNote("Processing CPU Fault(s) Belonging
441                 to a Known Event Scenario");
442             BRFH_RecoverJupiterCPU((CFault&)*pChainedFlt);
443             char szSeparator[80];
444             p_MainWnd—>MakeMessage(IDS_ALMSEPARATOR,
445         szSeparator);
446             p_MainWnd—>PrintLogi(szSeparator);
447             pCpuFltObject—>PrintNote("Continuing Processing of the original
448                 31C0 CPU Fault");
449             }
450         if(!bMultiCPU)
451             {
452             pCpuFltObject—>PrintAction("Single CPU System -
453                 Going to System Disaster");
454             pCpuFltObject—>GotoSystemDisaster( );
455             }
456         else
457             {
458             pCpuFltObject—>ReleaseUnit( );
459             pCpuFltObject—>DumpHardware( );
460             }
461         break;
462     case //other error codes
463         ... etc. ...
464         }
465     }
466     WORD FAR PASCAL BRFH_RecoverSysDisaster (CFault& P_rFltObject)
467     {
468     CFaultCss& rFltCssObject = (CFaultCss&)P_rFltObject;
469     rFltCssObject.GotoSystemDisaster( );
470     return (0);
471     }
472     void CFaultCss::GotoSystemDisaster(void)
473     {
474     WORD wstatus;
475     BYTE i;
476     BYTE cbNumUnits;
477     T_ORUOBJECTS strucORUObjects;
478     BYTE cbsystem = GetSystem( );
479     wStatus = BRFH_MakeCssOruList ((CFaultCss*)this, (T_LPORUOBJECTS)&
480         strucORUObjects);
481     cbNumUnits = 0;
482     for (i = 0; i < D_MAXORUREC; i++)
483         {
484         if(strucORUObjects.pObj[i] != NULL)
485             cbNumUnits ++;
486         }
487     for (i = 0; i < cbNumUnits; i++)
488         strucORUObjects.pObj[i]—>ReleaseUnit( );
489     for (i = 0; i < cbNumUnits; i++)
490         strucORUObjects.pObj[i]—>DumpHardware( );
491     }
```

```
492  WORD FAR PASCAL BRFH_MakeCssOruList (CFaultCss* P_pFltObject,
493      T_LPORUOBJECTS P_lpORUObjects)
494  {
495  CFaultCss* pFltObject;
496  CFaultCss* pFltObject1;
497  CFaultCss* pFltObject2;
498  CFaultCss* pFltObject3;
499  BYTE i;
500  pFltObject = NULL;
501  pFltObject1 = P_pFltObject;
502  pFltObject2 = NULL;
503  pFltObject3 = NULL;
504  P_lpORUObjects—>pObj[0] = P_pFltObject;
505  for (i = 1; i < D_MAXORUREC; i++)
506      P_lpORUObjects—>pObj[i] = NULL;
507  i = 1;
508  pFltObject = (CFaultCss*)pFltObject1—>GetChainedFault( );
509  while ((pFltObject != NULL) && (i < D_MAXORUREC))
510      {
511      T_BASICRFHRECORD& rFltRecord = pFltObject—>GetFltRecord( );
512      T_BASICRFHRECORD& rFltRecord1 = pFltObject1—>GetFltRecord( );
513      BOOL bUsed = FALSE;
514      if((rFltRecord.cbUnit != rFltRecord1.cbUnit) || (rFltRecord.cbType
515          != rFltRecord1.cbType))
516          {
517          pFltObject2 = pFltObject;
518          P_lpORUObjects—>pObj[i] = pFltObject;
519          bUsed = TRUE;
520          i++;
521          }
522      if((bUsed == FALSE) && (pFltObject2 != NULL))
523          {
524          T_BASICRFHRECORD& rFltRecord2 =
525  pFltObject2—>GetFltRecord( );
526          if((rFltRecord.cbUnit != rFltRecord2.cbUnit) || (rFltRecord.cbType)
527              != rFltRecord2.cbType))
528              {
529              pFltObject3 = pFltObject;
530              P_lpORUObjects—>pObj[i] = pFltObject;
531              bUsed = TRUE;
532              i++;
533              }
534          }
535      FltObject = (CFaultCss*)pFltObject—>GetChainedFault( );
536      }
537  return (0);
538  }
539  BOOL CFaultCPU::ReleaseUnit( )
540  {
541  SPFBARFCommand BARFCommand;
542  char szMsg[80];
543  BYTE cbReason;
544  BYTE cbUnitNum = GetUnitNum( );
545  wsprintf(szMsg, "Releasing CPU%d", cbUnitNum);
546  PrintAction(szMsg);    // print action message
547  if(!CheckMultiUnit( ))
548      // this check necessary for system disaster releases.
549      {
550      wsprintf(szMsg, "CPU%d not Released - Single-CPU System",
551  cbUnitNum);
552      PrintResult(szMsg);
553      return FALSE;
554      }
555  if FOS_ENABLED(D_ENABLEDEF)
556      // Check FOS option for how to release this unit
557      cbReason = DSP_ARFDEFECTIVE;    // release DEFECTIVE
558  else
559      // release OTHER so RCF can re-assign (for debug)
560      cbReason = DSP_ARFALLOTHER;
561  m_hACB = BARFCommand.BuildCPUCmdBlock(DSP_ARFEXECUTE,
562  DSP_ARFRELEASE, cbReason, cbUnitNum, GetArfSysNum( ));
563  return CFault::ReleaseUnit( );
564  ERROR_EXIT:
565      PrintResult("Error Releasing Unit");
566      return FALSE;
567  }
568  BOOL CfaultMU::ReleaseUnit( )
569  {
570  SPFBARFCommand BARFCommand;
571  char szMsg[80];
```

```
572    BYTE cbReason;
573    BYTE cbUnitNum = GetUnitNum( )
574    wsprintf(szMsg, "Releasing MU%d", cbUnitNum);
575    PrintAction(szMsg);    // print action message
576    if (!CheckMultiUnit( )) // don't release the only MU on the system
577         {
578         wprintf(szMsg, "MU%d not Released - Single-MU System",
579    cbUnitNum);
580         PrintResult(szMsg);
581         return FALSE;
582         }
583    if FOSENABLED(D_ENABLEDEF)
584         // Check FOS option for how to release this unit
585         cbReason = DSP_ARFDEFECTIVE; // release DEFECTIVE
586    else
587         // release OTHER so RCF can re-assign (for debug)
588         cbReason = DSP_ARFALLOTHER;
589    m_hACB = BARFCommand.BuildMUCmdBlock(DSP_ARFEXECUTE,
590    DSP_ARFRELEASE, cbReason, cbUnitNum, GetArfSysNum( ));
591    return CFault::ReleaseUnit( );
592    ERROR_EXIT:
593         PrintResult("Error Releasing Unit");
594         return FALSE;
595    }
596    BOOL CFault::ReleaseUnit( )
597    {
598    SPFBARFCommand BARFCommand;
599    TSP_LPARFCMDBLOCK lpARFCmd;
600    DWORD dwStatus;
601    char szMsg[80];
602    if (!m_hACB)
603         NONFATAL_EXIT(m_hACB, m_FltRecord.cbUnit);
604    // set RFH-specific flags
605    if(!(lpARFCmd = (TSP_LPARFCMDBLOCK)GlobalLock (m_hACB)))
606         NONFATAL_EXIT (m_hACB, D_ERROR)
607    lpARFCmd—> bForce = TRUE;
608    // this flag tells BARF that RFH is calling: release CPU by Shutdown Fault only
609    lpARFCmd—>bFault = TRUE;
610    if (GlobalUnlock (m_hACB))
611         NONFATAL (m_hACB, D_ERROR)
612    // Execute the Unit Release
613    if (BARFCommand.Start( ))    // Start up ARF and the DDE Session
614         {
615         // PostMessage and wait for DDE Ack
616         dwStatus = BARFCommand.SendDDE(m_hACB);
617         m_hACB = NULL;   // the handle was freed by the Service Cmd object
618         // Loword is status. Both are null if no response.
619         if (!dwStatus)
620             {
621             PrintResult("Timeout waiting for ARF to ReleaseUnit");
622             return FALSE;
623             }
624         if (LOWROD(dwStatus) != DSP_DONE)
625             {
626             wsprintf(szMsg, "Error Releasing Unit - ARF Status
627                 = %081x", dwStatus);
628             PrintResult(szMsg);
629             return FALSE;
630             }
631         }
632    else // Could not start ARF
633         {
634         PrintResult("Error Starting ARF - Unit not Released");
635         GlobalFree(m_hACB);
636         m_hACB = NULL;
637         return FALSE;
638         }
639    PrintResult("Unit Successfully Released");
640    return TRUE;
641    ERROR_EXIT:
642         PrintResult("Error Releasing Unit");
643         return FALSE;
644    }
```

What is claimed is:

1. A prerecorded data storage medium comprising:

a. a data storage medium; and b. indicia recorded on the medium, the indicia comprising instructions, in a program for a first computer, for:

recognizing a fault signal provided by a fault monitor of a second computer;

instantiating a polymorphic fault object in response to the fault signal, the polymorphic fault object comprising a data structure that identifies a fault processing method; and dynamically binding the fault processing method to the program in response to the data structure in order to reduce recurrence of the fault signal.

2. The medium of claim 1 wherein the instructions are executable by the first computer.

3. The medium of claim 1 wherein the instructions are executable by an interpreter running on the first computer.

4. The medium of claim 1 wherein the object further comprises data conveyed with the fault signal.

5. The medium of claim 4 wherein the data comprises an identifier of a component of the second computer system.

6. The medium of claim 5 wherein the fault processing method comprises enabling a replacement for the component.

7. The medium of claim 5 wherein the fault processing method comprises disabling the component.

8. The medium of claim 1 wherein the fault processing method comprises limiting further operation of the second computer system.

9. The medium of claim 1 wherein the fault processing method is inherited by the polymorphic fault object.

10. A prerecorded data storage medium comprising:
   a. a data storage medium; and
   b. indicia recorded on the medium, the indicia comprising instructions, in a program for a first computer, for:
      recognizing a first fault signal and a second fault signal, each fault signal provided by a fault monitor of a second computer;
      instantiating a first polymorphic fault object in response to the first fault signal, the first polymorphic fault object comprising data identifying a first component of the second computer;
      instantiating a second polymorphic fault object in response to the second fault signal, the second polymorphic fault object comprising data identifying a second component of the second computer, the second component being of a different type than the first component; and
      dynamically binding the first polymorphic fault object and the polymorphic second fault object to a fault processing method to reuse the fault processing method.

11. The medium of claim 10 wherein the fault processing method comprises an entry point and dynamic binding binds the first polymorphic fault object to the entry point and the second polymorphic fault object to the entry point.

12. The medium of claim 10 wherein the method is defined in a first class and the first polymorphic fault object and the second polymorphic fault object are each derived from the first class.

13. The medium of claim 10 wherein the fault processing method comprises a first entry point and a second entry point, and in the step of dynamic binding, the first polymorphic fault object is bound to the first entry point and the second polymorphic fault object is bound to the second entry point.

14. The medium of claim 13 wherein the fault processing method is defined in a class and the first polymorphic fault object and the second polymorphic fault object are each derived from the class.

15. The medium of claim 10 wherein the indicia further comprise:
   a first structure for the first polymorphic fault object, the first structure having first address and comprising a first plurality of vectors, each vector having a respective value and a respective position relative to the first address; and
   a second structure for the second polymorphic fault object, the second structure having a second address and comprising a second plurality of vectors, each vector having a respective value and a respective position relative to the second address; wherein the step of dynamically binding comprises assigning a value to a first vector of the first plurality and assigning the value to a second vector of the second plurality.

16. The medium of claim 15 wherein the relative position of the first vector is identical to the relative position of the second vector.

17. The medium of claim 15 wherein the first plurality is identical in number of vectors to the second plurality.

* * * * *